US008850438B2

(12) United States Patent
Kettley et al.

(10) Patent No.: US 8,850,438 B2
(45) Date of Patent: Sep. 30, 2014

(54) MANAGING THE PROCESSING OF PROCESSING REQUESTS IN A DATA PROCESSING SYSTEM COMPRISING A PLURALITY OF PROCESSING ENVIRONMENTS

(75) Inventors: Paul Kettley, Winchester (GB); Daniel N. Millwood, Bitterne (GB); Geoffrey S. Pirie, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 756 days.

(21) Appl. No.: 12/626,794

(22) Filed: Nov. 27, 2009

(65) Prior Publication Data

US 2010/0199281 A1    Aug. 5, 2010

(30) Foreign Application Priority Data

Feb. 5, 2009   (EP) .................................... 09152102

(51) Int. Cl.
*G06F 9/46* (2006.01)
*G06F 9/50* (2006.01)

(52) U.S. Cl.
CPC .............. *G06F 9/505* (2013.01); *G06F 9/5055* (2013.01)
USPC ............................ 718/103; 718/102; 718/105

(58) Field of Classification Search
None
See application file for complete search history.

(56) References Cited

U.S. PATENT DOCUMENTS

| 7,660,896 | B1 * | 2/2010 | Davis et al. .................. 709/226 |
| 7,673,113 | B2 * | 3/2010 | Sugumar et al. ............. 711/170 |
| 7,822,860 | B2 * | 10/2010 | Brown et al. ................. 709/228 |
| 2006/0112388 | A1 | 5/2006 | Taniguchi et al. |
| 2009/0158293 | A1 | 6/2009 | Kajihara |
| 2012/0167096 | A1 | 6/2012 | Kettley et al. |

OTHER PUBLICATIONS

Paul Kettley et al., U.S. Appl. No. 13/413,307, filed Mar. 6, 2012, Office Action, Jul. 9, 2012, 14 pages.
Paul Kettley et al., U.S. Appl. No. 13/413,307, filed Mar. 6, 2012, Office Action, Jan. 7, 2013, 12 pages.
Paul Kettley et al., U.S. Appl. No. 13/413,307, filed Mar. 6, 2012, Office Action, Jan. 30, 2014, 9 pages.

* cited by examiner

*Primary Examiner* — Abdullah Al Kawsar
*Assistant Examiner* — Wissam Rashid
(74) *Attorney, Agent, or Firm* — Marcia L. Doubet

(57) ABSTRACT

Processing requests may be routed between a plurality of runtime environments, based on whether or not program(s) required for completion of the processing requests is/are loaded in a given runtime environment. Cost measures may be used to compare costs of processing a request in a local runtime environment and of processing the request at a non-local runtime environment.

16 Claims, 5 Drawing Sheets

| Runtime Enviroment Identifier | Cumulative Costs | | | |
|---|---|---|---|---|
| | Processing | Loading Locally | Loading Locally Requires Unloading | Receiving Routed Processing Request |
| RE 1 | 5 | 10 | 15 | 5 |
| RE 2 | 5 | 10 | 15 | 5 |
| RE 3 | 10 | 15 | 20 | 5 |
| RE 4 | 10 | 15 | 20 | 5 |
| RE 5 | 15 | 20 | 25 | 5 |
| RE 6 | 15 | 20 | 25 | 10 |

Figure 3

MANAGING THE PROCESSING OF PROCESSING REQUESTS IN A DATA PROCESSING SYSTEM COMPRISING A PLURALITY OF PROCESSING ENVIRONMENTS

CROSS-REFERENCE TO RELATED APPLICATION

The present application claims priority of European Patent Application 09152102.1, titled "A Method, Apparatus or Software for Managing the Processing of Processing Requests in a Data Processing System Comprising a Plurality of Processing Environments", which was filed on Feb. 5, 2009 and which is incorporated herein by reference.

BACKGROUND

The present invention relates to managing the processing of processing requests in a data processing system comprising a plurality of processing environments.

Some computer systems are arranged with multiple runtime environment management application programs capable of providing a plurality of cloned runtime environments. Each such runtime environment is capable of running a set of application programs. Multiple runtime environments enable the services of the set of application programs to be provided with high availability and to a larger number of users.

In such multiple runtime arrangements, a workload manager module is commonly provided for receiving and distributing processing requests to the appropriate application programs running in one or more of the multiple runtime environments. However, the memory available to a runtime environment may not be sufficient to store all of the application programs that would be required to satisfy all possible processing requests. Therefore, at any given time, a particular runtime environment may not be loaded with all of the application programs required to deal with received processing requests.

In such a situation, if a runtime environment receives a processing request and the application program required to process the request is not currently loaded, the required application program is loaded in order to meet the processing request. In some situations, one or more application programs that are currently loaded in the memory of the runtime environment may need to be cleared in order to provide sufficient space to load the application program required to meet the received processing request.

BRIEF SUMMARY

An embodiment of the invention provides a method for managing processing of processing requests in a data processing system comprising a plurality of processing environments, comprising: receiving a processing request for a first processing environment, completion of the processing request requiring services provided by a set of one or more programs; determining whether the set of programs is loaded in the first processing environment; and if the set of programs is not loaded in the first processing environment, then identifying a second processing environment in which the set of programs is loaded and providing the processing request for processing in the second processing environment.

In one approach, the processing request is only provided to the second runtime environment if the loading of the set of programs in the first processing environment would require clearing of one or more other programs from the memory of the first runtime. A predetermined loading cost measure may be assigned to loading the set of programs in the first processing environment and a predetermined routing cost measure may be assigned to the providing of the processing request to the second processing environment, and if the loading cost measure is less than the routing cost measure, then the set of programs is loaded in the first processing environment and the processing request is processed in the first processing environment.

If one or more loaded programs must be cleared from memory in order to load the set of programs, then a predetermined clearing cost measure may be added to the loading cost measure. A respective predetermined processing cost measure may be assigned to the processing of the processing request in the first and second processing environments and added respectively to the loading cost measure and the routing cost measure. The cost measures may be predetermined for each processing environment. The cost measures may be predetermined for one or more of the set of programs. One or more of the cost measures may be representative of processing resources required to perform a task associated with the respective cost measure. One or more of the cost measures may be determined dynamically. The first and second processing environments may be clones. The method may be performed by a workload manager, an application server application program, and/or a transactional data processing application program.

Another embodiment provides apparatus for managing processing of processing requests in a data processing system comprising a plurality of processing environments, the apparatus being operable to: receive a processing request for a first processing environment, completion of the processing request requiring services provided by a set of one or more programs; determine whether the set of programs is loaded in the first processing environment; and if the set of programs is not loaded in the first processing environment, then identify a second processing environment in which the set of programs is loaded and provide the processing request for processing in the second processing environment.

Another embodiment provides a computer program product loadable into internal memory of a digital computer for managing processing of processing requests in a data processing system comprising a plurality of processing environments, the computer program product comprising software code portions executable on a computer to perform: receiving a processing request for a first processing environment, completion of the processing request requiring services provided by a set of one or more programs; determining whether the set of programs is loaded in the first processing environment; and if the set of programs is not loaded in the first processing environment, then identifying a second processing environment in which the set of programs is loaded and providing the processing request for processing in the second processing environment.

An embodiment may be provided by a group of one or more programs arranged to enable a group of one or more programmable devices to carry out the disclosed techniques.

BRIEF DESCRIPTION OF THE SEVERAL VIEWS OF THE DRAWINGS

Embodiments of the invention will now be described, by way of example only, with reference to the accompanying drawings in which:

FIG. 3 is a table illustrating cost data used by the application program of FIG. 2;

DETAILED DESCRIPTION

Figure 1:
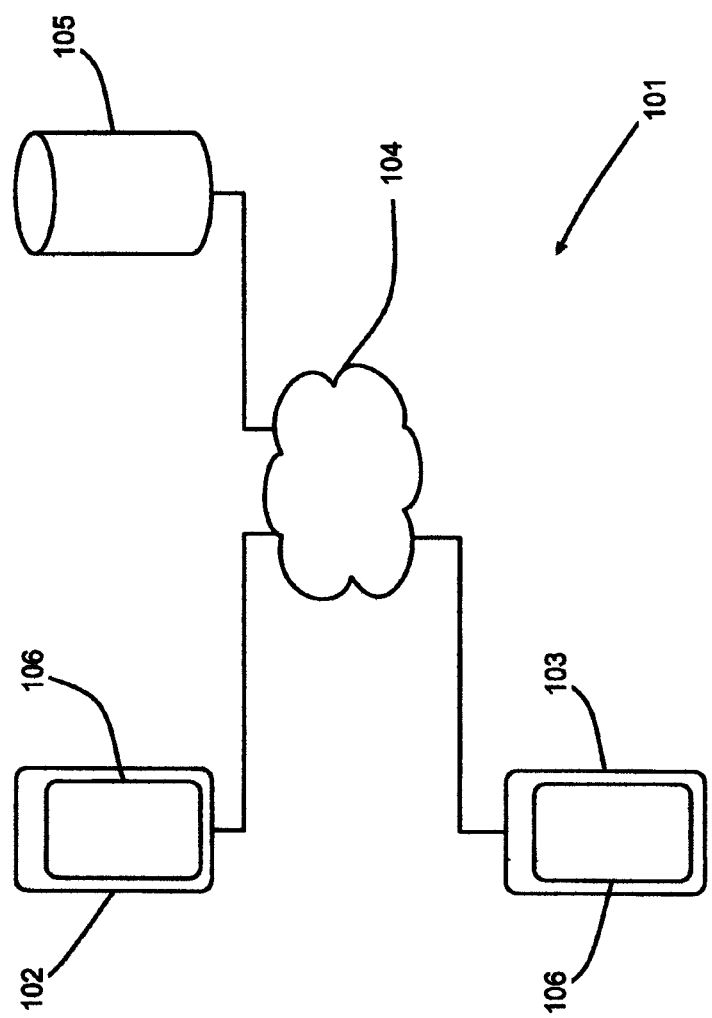
FIG. 1 is a schematic illustration of a computer system.
Figure 2:
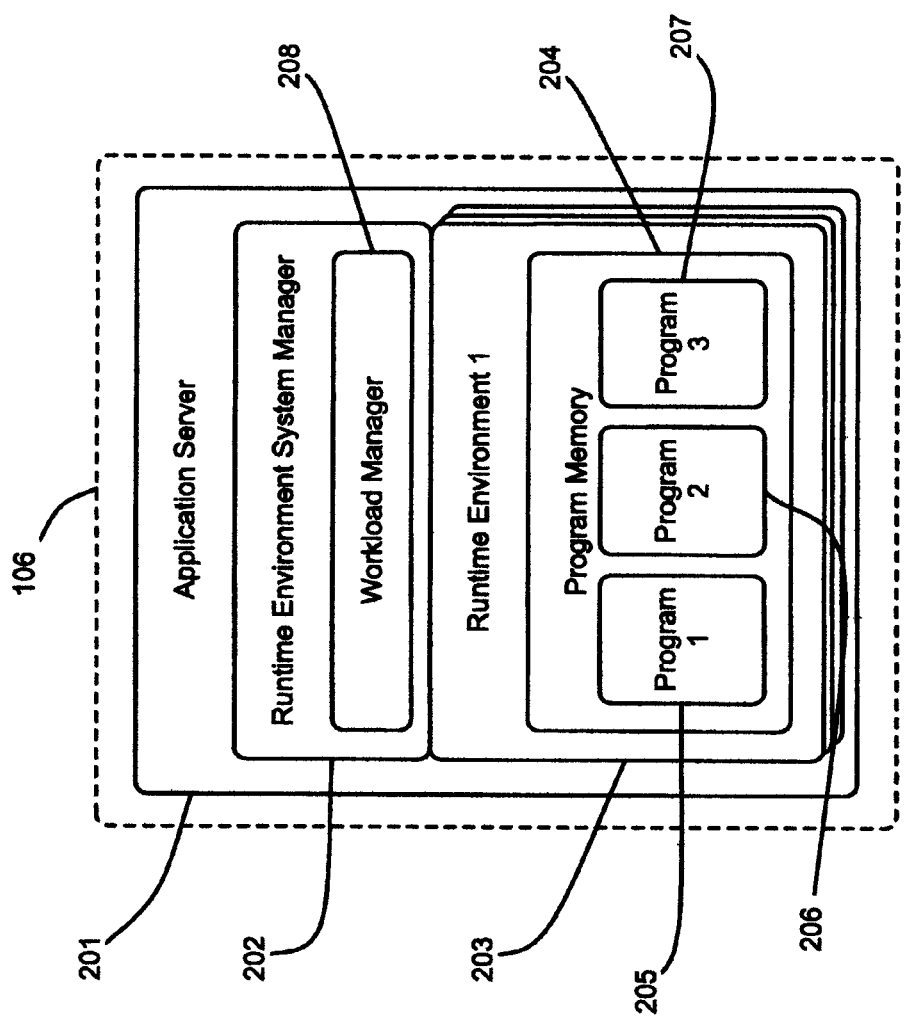
FIG. 2 is a schematic illustration of an application program provided on one of the computers of FIG. 1.

With reference to FIG. 1, a computer system 101 comprises two computers 102, 103 connected via a network 104 to a storage device 105. Each of the computers 102, 103 is loaded with an operating system 106 arranged to enable communications between the computers 102, 103 and the storage device 105. With reference to FIG. 2, one of the computers 102 is loaded with an application program 201 in the form of an application server. The other computer 103 is loaded with a client application program (not shown) arranged to enable users to access the services provided by the application server 201 over the network 104.

The application server 201 comprises a runtime environment system manager (RESM) module 202 and a set of runtime environments 203. Each runtime environment 203 is assigned program memory 204 for storing a set of application programs 205, 206, 207. The application programs 205, 206, 207 are loaded from a library of such programs (not shown) stored on the storage device 105. The RESM 202 is arranged to manage the multiple runtime environments 203 so as to present a single runtime environment with high availability and scalability for responding to user processing requests received by the application server 201.

The application programs 205, 206, 207 are loaded into the memory 204 under the control of the runtime environment 203 as required by the processing requests received from a user. As a result, at any given time, the set of application programs loaded in a given runtime environment 203 will be a product of the more recently executed processing requests. Therefore, each of runtime environments 203 are likely to have differing sets of application programs loaded at any given time and may not have an appropriate application program loaded to handle a given processing request.

The RESM 202 further comprises a workload manager 208 arranged to route processing requests to a selected one of the multiple runtime environments 203 depending on where the application programs required by the processing request are currently loaded. In one embodiment, a first one of the runtime environments is arbitrarily selected as the local runtime environment with the remaining runtime environments treated as non-local runtime environments, and the selection of a given runtime environment by the workload manager 208 for processing a received processing request is determined by a cost measure. The cost measure is arranged to take into account the relative processing costs of loading or unloading application programs in the local runtime environment and the transmission of the processing request to an alternative non-local runtime environment for equivalent processing.

With reference to FIG. 3, in one embodiment, the workload manager 208 is provided with a table of cost measures 301. In one embodiment, the cost measures are predetermined by a system administrator so as to be representative of the processing and performance costs of the routing decisions made by the workload manager 208. In the example of FIG. 3, the costs 301 are provided for each of six runtime environments 203 (shown as having identifiers RE1, RE2, RE3, RE4, RE5, RE6) provided within the application server 201.

As shown in the table of FIG. 3, "Processing" costs 302 are defined for processing a request when the appropriate application program is already loaded. "Loading Locally" costs 303 are defined for when the appropriate application program is not currently loaded and would thus need to be loaded to process a given processing request. "Loading Locally Requires Unloading" costs 304 are defined for the local loading of an application program where one or more currently loaded application programs would need to be cleared from memory in order to provide space. "Receiving a Routed Processing Request" costs 305 are defined for routing a request to the respective runtime environment 203 for processing. In one embodiment, the costs 301 are cumulative. For example, the costs of loading and using a given application program is the sum of the Processing 302 and the Loading Locally 303 costs. Thus, in one embodiment, every processing request has a minimum cost—that is, the Processing cost 302.

Figure 4:
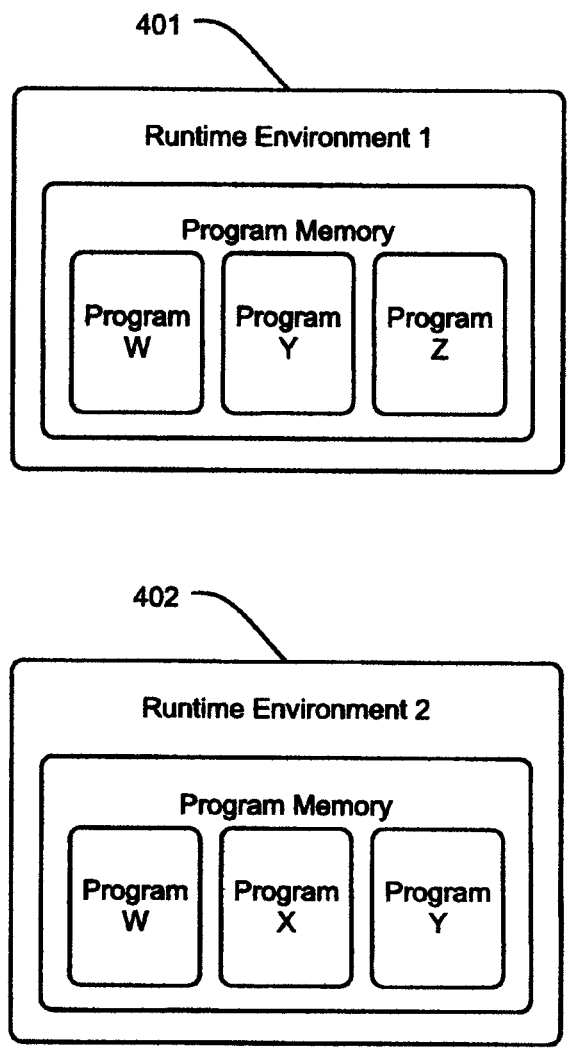
FIG. 4 shows an example of routing a processing request in the application program of FIG. 2.

FIG. 4 illustrates a local and a non-local cloned runtime environments (RE1 and RE2) 401, 402. Each runtime environment 401, 402 is loaded with a subset of a library of application programs W, X, Y, and Z. This results in an arrangement of application programs, as shown in FIG. 4, where (in this example) RE1 is loaded with application programs W, Y, and Z and RE2 is loaded with W, X, and Y. Given a new processing request, received by RE1 401 for application program X, suppose the workload manager 208 for RE1 401 determines that loading application program X in RE1 401 would require dropping (i.e., unloading) another application program Z. Thus, from the table of FIG. 3, the associated cumulative costs for local RE1 401 are as follows:

Processing=5

Loading Locally=10

Unloading=15

Cumulative Cost=30

The workload manager 208 also identifies (in this example) that application program X is already loaded in non-local RE2 402. From the table of FIG. 3, the associated cumulative costs for RE2 402 are as follows:

Processing=5

Receiving Request=5

Cumulative Cost=10

In summary, a cost of 30 is associated with processing the request in the local RE1 401 and a cost of 10 is associated with routing the request to the non-local RE2 402. Therefore, the workload manager 208 will route the request for application program X to RE2 402.

Figure 5:
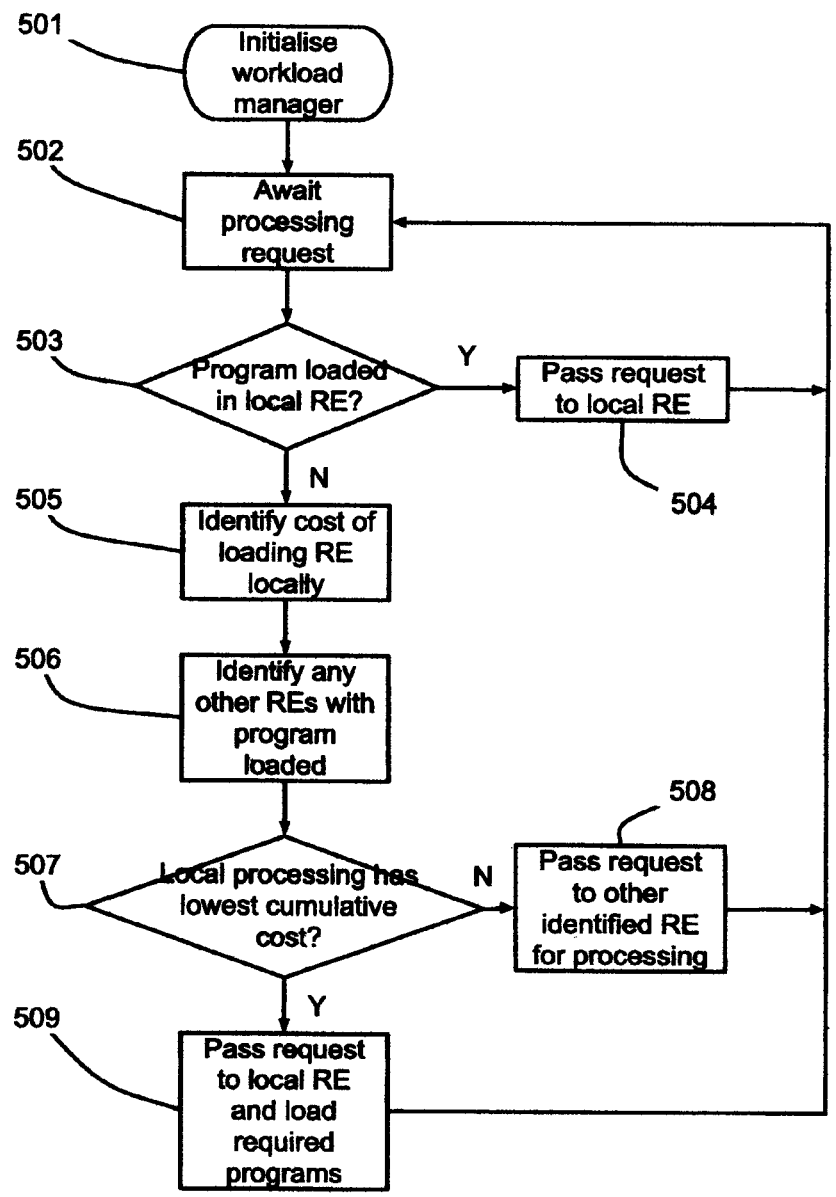
FIG. 5 is a flow chart illustrating the processing performed by the application program of FIG. 2 for routing processing requests.

The processing performed by the workload manager 208 when determining where a given processing request should be processed will now be described in further detail with reference to the flow chart of FIG. 5. At step 501, processing is initiated in response to the start-up of the RESM 202 and processing moves to step 502. At step 502, processing awaits the receipt of a processing request and once received processing moves to step 503. At step 503, the programs required to satisfy the processing request are identified and the local runtime environment is inspected to determine whether the required programs are already loaded. If the required programs are already loaded in the local runtime environment, then processing moves to step 504 where the processing request is passed to the local runtime environment for processing. Processing then moves to step 502 and proceeds as described above.

If at step 503 one or more of the required programs are not loaded in the local runtime environment, then processing moves to step 505. At step 505, the cumulative costs of loading the required programs in the local runtime environment are determined from the cost measure table 301 and processing moves to step 506. At step 506, any non-local runtime environments that have the required programs loaded are identified and the respective costs of routing the processing request to them are determined. Processing then moves to step 507, where the cost of loading the required programs in the local runtime environment is compared to those of routing the processing request to each of the other identified runtime environments. If routing the processing request to one of the other identified runtime environments has a lower cost, then processing moves to step 508 where the processing request is routed accordingly. Processing then returns to step 502 and proceeds as described above. If at step 507, local processing is identified as carrying a lower cost, then processing moves to step 509. At step 509, the processing request is passed to the local runtime environment and the required application program(s) is/are loaded in order to process the request. Processing then returns to step 502 and proceeds as described above.

In another embodiment, cost measures are determined for one or more individual application programs instead of using a generic cost for loading an application program, unloading an application program, or routing a request to execute an application program. In a further embodiment, cost measures take into account one or more attributes of a given application program such as program size or required processing power. In another embodiment, the cost of clearing a given program from memory is based on the cost of reloading the same program. In a further embodiment, the cost of clearing a given program from memory is modified by a measure of the usage of the unloaded program. For example, a regularly used program may be more costly to remove than a less regularly used program. In another embodiment, no local processing costs are provided in the costs measure. In a further embodiment, the costs are non-cumulative—that is, each cost measure takes into account all of the relevant consequential actions. For example, the cost for unloading includes the cost for loading the replacement program.

As will be understood by those skilled in the art, the cost measures may be arbitrarily determined or may be based on any suitable attribute or combination of attributes of the application programs or related memory management such as required processing resources, program performance, program use, or processing delay. Some costs may be relative—that is, a given runtime environment may have one or more specific cost, such as network or routing costs. Costs may be determined that are specific to one or more subsets of a superset of runtime environments.

In another embodiment, the cost measure is omitted. When a processing request is received requiring a set of one or more application programs for its completion, the local runtime environment is checked to determine if the required set of application programs is already loaded. If so, the processing request is passed to the local runtime environment for processing. If not, other available non-local runtime environments are inspected to determine if the required set of application programs is already loaded. If so, the processing request is passed to a relevant non-local runtime environment for processing. If the required set of application programs is not loaded in any of the non-local runtime environments, then the processing request is passed to the local runtime environment for processing once the required set of application programs has been locally loaded.

In a further embodiment, the cost measures are determined empirically from monitoring the performance of the application program. In another embodiment, the costs measures are determined dynamically.

It will be understood by those skilled in the art that an apparatus that embodies a part or all of the present invention may be a general purpose device having software arranged to provide a part or all of an embodiment of the invention. The device could be a single device or a group of devices and the software could be a single program or a set of programs. Furthermore, any or all of the software used to implement the invention can be communicated via any suitable transmission or storage means so that the software can be loaded onto one or more devices.

While the present invention has been illustrated by the description of embodiments thereof, and while these embodiments have been described in considerable detail, this description is not intended to restrict or in any way limit the scope of the appended claims to such detail. Additional advantages and modifications will readily appear to those skilled in the art. Therefore, the invention in its broader aspects is not limited to the specific details and illustrative examples shown and described herein. Accordingly, departures may be made from such details without departure from the spirit or scope of the invention.

The invention claimed is:

1. An apparatus for managing processing of processing requests in a data processing system comprising a computer on which execute at least a first processing environment and a second processing environment, the apparatus being configured to:

receive a processing request for the first processing environment of the computer, completion of the processing request requiring services provided by a set of one or more programs;

determine whether the set of one or more programs is loaded in the first processing environment; and responsive to determining that the set of one or more programs is not loaded in the first processing environment, determine whether to process the processing request in the first processing environment or to route the processing request by performing:

determining a second processing environment in which the set of one or more programs is already loaded;

computing a cost of loading the set of one or more programs in the first processing environment, and if at least one loaded program must be cleared from memory of the first processing environment in order to load the set of one or more programs in the first processing environment, then including a predetermined cost of the clearing when computing the cost of loading the set of one or more programs;

computing a cost of routing the processing request to the second processing environment, wherein the cost of loading the set of one or more programs in the first processing environment and the cost of routing the processing request to the second processing environment are predetermined; and determining that the processing request will be routed to the second processing environment for processing therein only if the computed cost of the routing is less than the computed cost of the loading and otherwise determining that the processing request will be processed in the first processing environment.

2. The apparatus according to claim 1, wherein a respective predetermined processing cost is assigned to the processing of the processing request in the first and second processing environments and is included respectively in the cost of the loading and the cost of the routing.

3. The apparatus according to claim 1, wherein the cost of the loading and the cost of the routing are specific to each of the first and second processing environments.

4. A computer program product loadable into memory of a digital computer for managing processing of processing requests in a data processing system comprising a computer on which execute at least a first processing environment and a second processing environment, the computer program product comprising software code portions executable on a computer to perform:
  receiving a processing request for the first processing environment of the computer, completion of the processing request requiring services provided by a set of one or more programs;
  determining whether the set of one or more programs is loaded in the first processing environment; and
  responsive to determining that the set of one or more programs is not loaded in the first processing environment, determining whether to process the processing request in the first processing environment or to route the processing request by performing:
    determining a second processing environment in which the set of one or more programs is already loaded;
    computing a cost of loading the set of one or more programs in the first processing environment, and if at least one loaded program must be cleared from memory of the first processing environment in order to load the set of one or more programs in the first processing environment, then including a predetermined cost of the clearing when computing the cost of loading the set of one or more programs;
    computing a cost of routing the processing request to the second processing environment, wherein the cost of loading the set of one or more programs in the first processing environment and the cost of routing the processing request to the second processing environment are predetermined; and
    determining that the processing request will be routed to the second processing environment for processing therein only if the computed cost of the routing is less than the computed cost of the loading and otherwise determining that the processing request will be processed in the first processing environment.

5. The apparatus according to claim 1, wherein the cost of loading reflects at least one attribute of at least one of the one or more programs in the set of one or more programs.

6. The apparatus according to claim 5, wherein the at least one attribute comprises one of a program size and a required processing power.

7. The apparatus according to claim 1, wherein the cost of clearing reflects a measure of usage of the set of one or more programs.

8. The apparatus according to claim 1, wherein the cost of clearing reflects a cost of reloading the at least one program to be cleared.

9. The apparatus according to claim 1, wherein at least one of the cost of the loading and the cost of the routing are representative of processing resources required to perform a task associated with the respective cost.

10. The computer program product according to claim 4, wherein a respective predetermined processing cost is assigned to the processing of the processing request in the first and second processing environments and is included respectively in the cost of the loading and the cost of the routing.

11. The computer program product according to claim 4, wherein the cost of the loading and the cost of the routing are specific to each of the first and second processing environments.

12. The computer program product according to claim 4, wherein the cost of loading reflects a program size of at least one of the one or more programs in the set of one or more programs.

13. The computer program product according to claim 4, wherein the cost of loading reflects a required processing power of at least one of the one or more programs in the set of one or more programs.

14. The computer program product according to claim 4, wherein the cost of clearing reflects a measure of usage of the set of one or more programs.

15. The computer program product according to claim 4, wherein the cost of clearing reflects a cost of reloading the at least one program to be cleared.

16. The computer program product according to claim 4, wherein at least one of the cost of the loading and the cost of the routing are representative of processing resources required to perform a task associated with the respective cost.

* * * * *